(12) United States Patent
Bales

(10) Patent No.: US 11,370,016 B2
(45) Date of Patent: Jun. 28, 2022

(54) ASSEMBLY AND METHOD OF FORMING GAS TURBINE ENGINE COMPONENTS

(71) Applicant: United Technologies Corporation, Farmington, CT (US)

(72) Inventor: Daniel A. Bales, Avon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 203 days.

(21) Appl. No.: 16/420,291

(22) Filed: May 23, 2019

(65) Prior Publication Data

US 2020/0368805 A1 Nov. 26, 2020

(51) Int. Cl.

| B21D 53/78 | (2006.01) |
| B23P 15/02 | (2006.01) |
| F01D 5/14 | (2006.01) |
| B21J 15/02 | (2006.01) |
| B21J 13/02 | (2006.01) |

(52) U.S. Cl.
CPC .............. *B21D 53/78* (2013.01); *B21J 13/02* (2013.01); *B21J 15/02* (2013.01); *B23P 15/02* (2013.01); *F01D 5/147* (2013.01); *F05D 2230/20* (2013.01)

(58) Field of Classification Search
CPC ........ B21D 53/78; B21D 37/10; B21D 37/16; B23P 15/02; B21J 15/02; B21J 13/02; B21J 13/03; C21D 1/673; B30B 15/064; B30B 15/34
USPC ................................. 72/342.2, 342.3, 342.4
See application file for complete search history.

(56) References Cited

U.S. PATENT DOCUMENTS

| 2,047,296 A | * | 7/1936 | Squires | .................. B21D 53/78 |
| | | | | 72/57 |
| 2,132,581 A | * | 10/1938 | Schuster | ................... B21C 3/14 |
| | | | | 72/463 |
| 2,188,470 A | * | 1/1940 | Brandt | ....................... B21C 3/14 |
| | | | | 72/463 |
| 2,245,320 A | * | 6/1941 | Bletso | ....................... B21C 3/14 |
| | | | | 72/463 |

(Continued)

FOREIGN PATENT DOCUMENTS

| GB | 2073631 | 10/1981 |
| JP | 2018103266 | 7/2018 |

OTHER PUBLICATIONS

European Search Report for European Patent Application No. 20171932.5 completed Sep. 29, 2020.

*Primary Examiner* — Adam J Eiseman
*Assistant Examiner* — Fred C Hammers
(74) *Attorney, Agent, or Firm* — Carlson, Gaskey & Olds, P.C.

(57) ABSTRACT

A mounting plate for forming a gas turbine engine component according to an example of the present disclosure includes, among other things, a plate body defining an abutment dimensioned to mate with a forming die. The plate body defines at least one internal cooling circuit. The at least one internal cooling circuit includes a passageway having an intermediate portion interconnecting inlet and outlet portions. The intermediate portion is dimensioned to follow a perimeter of the abutment. The intermediate portion includes a plurality of fins extending partially from a first sidewall towards a second sidewall opposed to the first sidewall. A method of forming a gas turbine engine component is also disclosed.

18 Claims, 13 Drawing Sheets

(56) References Cited

U.S. PATENT DOCUMENTS

| | | | |
|---|---|---|---|
| 2,481,944 A * | 9/1949 | Nye | B21C 47/26 |
| | | | 72/419 |
| 3,621,700 A | 11/1971 | Wachtell et al. | |
| 3,754,499 A * | 8/1973 | Heisman | B30B 15/064 |
| | | | 219/461.1 |
| 4,188,811 A | 2/1980 | Brimm | |
| 5,063,662 A | 11/1991 | Porter et al. | |
| 5,269,058 A | 12/1993 | Wiggs et al. | |
| 5,793,024 A | 8/1998 | Matsen et al. | |
| 7,237,709 B2 | 7/2007 | Beckford | |
| 7,993,105 B2 | 8/2011 | Weisse et al. | |
| 8,205,476 B2 | 6/2012 | Voice | |
| 8,256,118 B2 | 9/2012 | Cammer | |
| 9,010,166 B2 | 4/2015 | Brennand | |
| 9,790,800 B2 | 10/2017 | Quigley | |
| 2008/0184762 A1 | 8/2008 | Hammer et al. | |
| 2013/0125603 A1* | 5/2013 | Liu | B21D 37/16 |
| | | | 72/342.3 |
| 2018/0200790 A1 | 7/2018 | Hart et al. | |
| 2018/0318966 A1 | 11/2018 | Evans et al. | |
| 2018/0319054 A1 | 11/2018 | Huang et al. | |
| 2019/0323618 A1* | 10/2019 | Fletcher | F04F 5/466 |
| 2019/0358691 A1* | 11/2019 | Swedberg | F28D 15/02 |
| 2021/0233828 A1* | 7/2021 | Meyer | H05K 7/20927 |

* cited by examiner

ASSEMBLY AND METHOD OF FORMING GAS TURBINE ENGINE COMPONENTS

BACKGROUND

This disclosure relates to a gas turbine engine, and more particularly to forming gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. The fan blade may be formed between a set of dies at an elevated temperature.

SUMMARY

A mounting plate for forming a gas turbine engine component according to an example of the present disclosure includes a plate body defining an abutment dimensioned to mate with a forming die. The plate body defines at least one internal cooling circuit. The at least one internal cooling circuit includes a passageway having an intermediate portion interconnecting inlet and outlet portions. The intermediate portion is dimensioned to follow a perimeter of the abutment. The intermediate portion includes a plurality of fins extending partially from a first sidewall towards a second sidewall opposed to the first sidewall.

In a further embodiment of any of the foregoing embodiments, the plurality of fins are integrally formed with the plate body, and each fin of the plurality of fins extends at least a majority of a distance between the first and second sidewalls.

In a further embodiment of any of the foregoing embodiments, the plurality of fins are uniformly distributed along the first sidewall such that the intermediate portion has a substantially constant cross-sectional area.

In a further embodiment of any of the foregoing embodiments, the plurality of fins are substantially parallel to each other.

In a further embodiment of any of the foregoing embodiments, a cross-sectional geometry of the inlet and outlet portions differs from a cross-sectional geometry of the intermediate portion.

In a further embodiment of any of the foregoing embodiments, the inlet and outlet portions have an elliptical cross-sectional geometry.

In a further embodiment of any of the foregoing embodiments, the passageway includes first and second transition sections that respectively taper inwardly from the intermediate portion to the inlet and outlet portions.

In a further embodiment of any of the foregoing embodiments, the at least one internal cooling circuit includes a first circuit and a second circuit fluidly isolated from the first circuit within the plate body, and the intermediate portion of the first circuit and the intermediate portion of the second circuit are defined on opposed sides of the abutment.

In a further embodiment of any of the foregoing embodiments, the plurality of fins of the first circuit extend in a first direction away from the abutment, and the plurality of fins of the second circuit extend in a second, opposed direction away from the abutment.

In a further embodiment of any of the foregoing embodiments, the plate body extends between top and bottom surfaces. The top surface defines the abutment, and the intermediate portion is spaced apart from the abutment for at least a majority of positions along the intermediate portion such that the plate body defines a direct load path between the abutment and the bottom surface.

In a further embodiment of any of the foregoing embodiments, the plate body extends between top and bottom surfaces, and the plate body defines at least one recess extending inwardly from at least one of the top and bottom surfaces.

In a further embodiment of any of the foregoing embodiments, the at least one recess extends inwardly from an opening along the top surface. The opening is surrounded by the abutment.

A die assembly for forming a gas turbine engine component according to an example of the present disclosure includes a support that has a pair of structural plates coupled to a base, a pair of forming dies dimensioned with respect to a predefined contour of a gas turbine engine component, and a pair of mounting plates mechanically attached to respective ones of the pair of forming dies along respective abutments such that the pair of forming dies oppose each other and such that the pair of forming dies are spaced apart from the pair of structural plates. Each one of the pair of mounting plates has a plate body defining at least one internal cooling circuit. The at least one internal cooling circuit has a passageway that follows a perimeter of a respective one of the abutments, and a plurality of fins extend across the passageway.

In a further embodiment of any of the foregoing embodiments, the at least one internal cooling circuit includes inlet and outlet portions dimensioned to fluidly couple the passageway to a coolant source. A pair of actuators move respective ones of the pair of mounting plates relative to the base. A pair of heating elements each are coupled to a respective one of the pair of forming dies.

In a further embodiment of any of the foregoing embodiments, the pair of forming dies are made of a first material, and the pair of mounting plates are made of a second material that differs from the first material.

A method of forming a gas turbine engine component according to an example of the present disclosure includes mounting a forming die to a mounting plate along an abutment, the mounting plate having a plate body defining the abutment and at least one internal cooling circuit, the at least one cooling circuit having a passageway that follows a perimeter of the abutment, and a plurality of fins extend across the passageway, heating the forming die to a predetermined temperature threshold, moving the forming die toward an adjacent forming die to deform a gas turbine engine component with respect to a predefined contour, and communicating fluid to the passageway to decrease a temperature of the mounting plate.

In a further embodiment of any of the foregoing embodiments, the communicating step occurs during the heating step.

In a further embodiment of any of the foregoing embodiments, the step of moving the forming die includes moving an actuator to cause the mounting plate to move towards the gas turbine engine component.

In a further embodiment of any of the foregoing embodiments, the at least one internal cooling circuit has a first circuit and a second circuit fluidly isolated from the first circuit within the plate body. The plurality of fins of the first and second circuits arranged on opposed sides of the abutment.

In a further embodiment of any of the foregoing embodiments, the gas turbine engine component is an airfoil, and the moving step includes moving the forming die towards and into abutment with a pressure side or a suction side of the airfoil.

The various features and advantages of this disclosure will become apparent to those skilled in the art from the following detailed description. The drawings that accompany the detailed description can be briefly described as follows.

DETAILED DESCRIPTION

Figure 1:
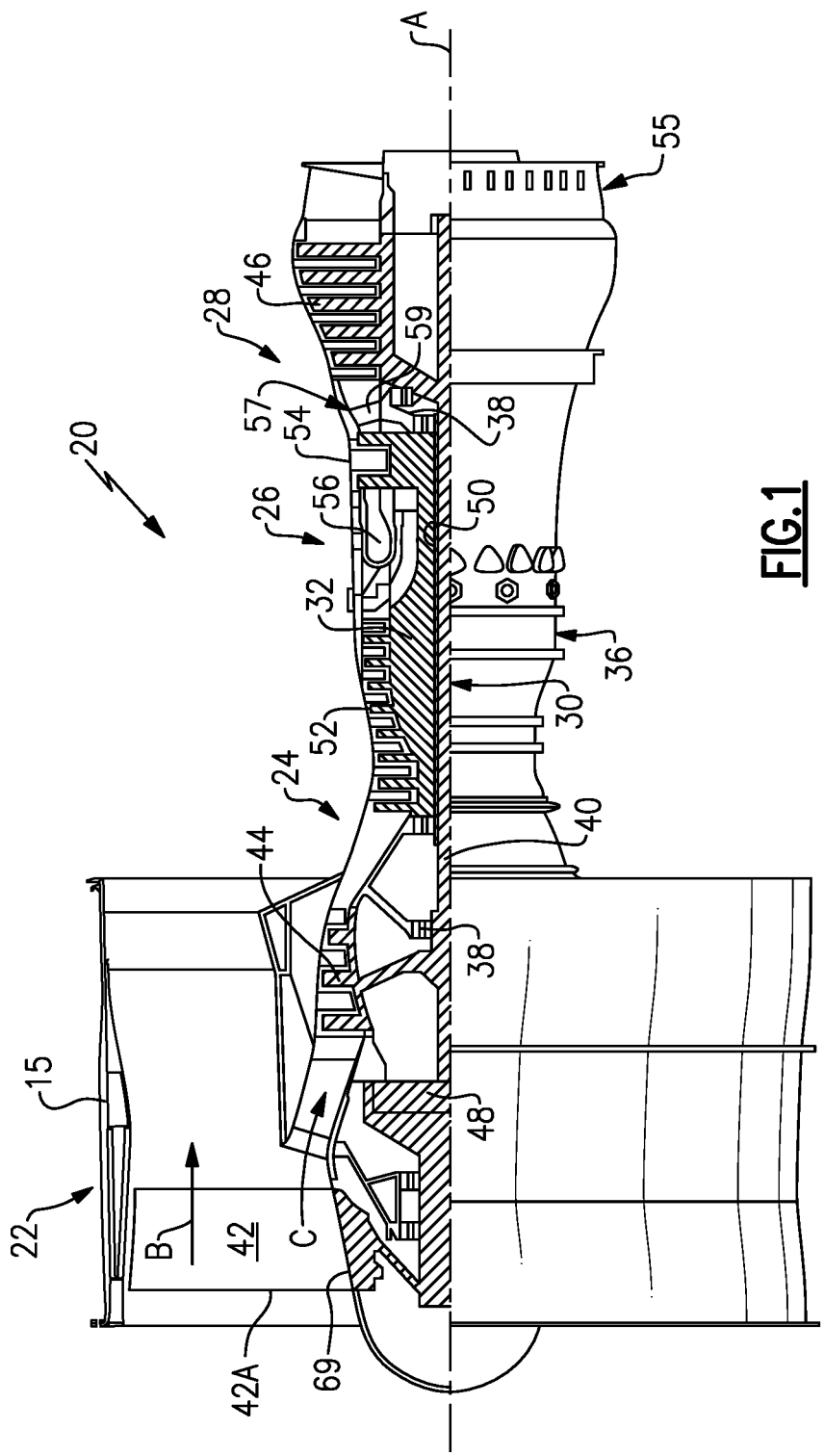
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
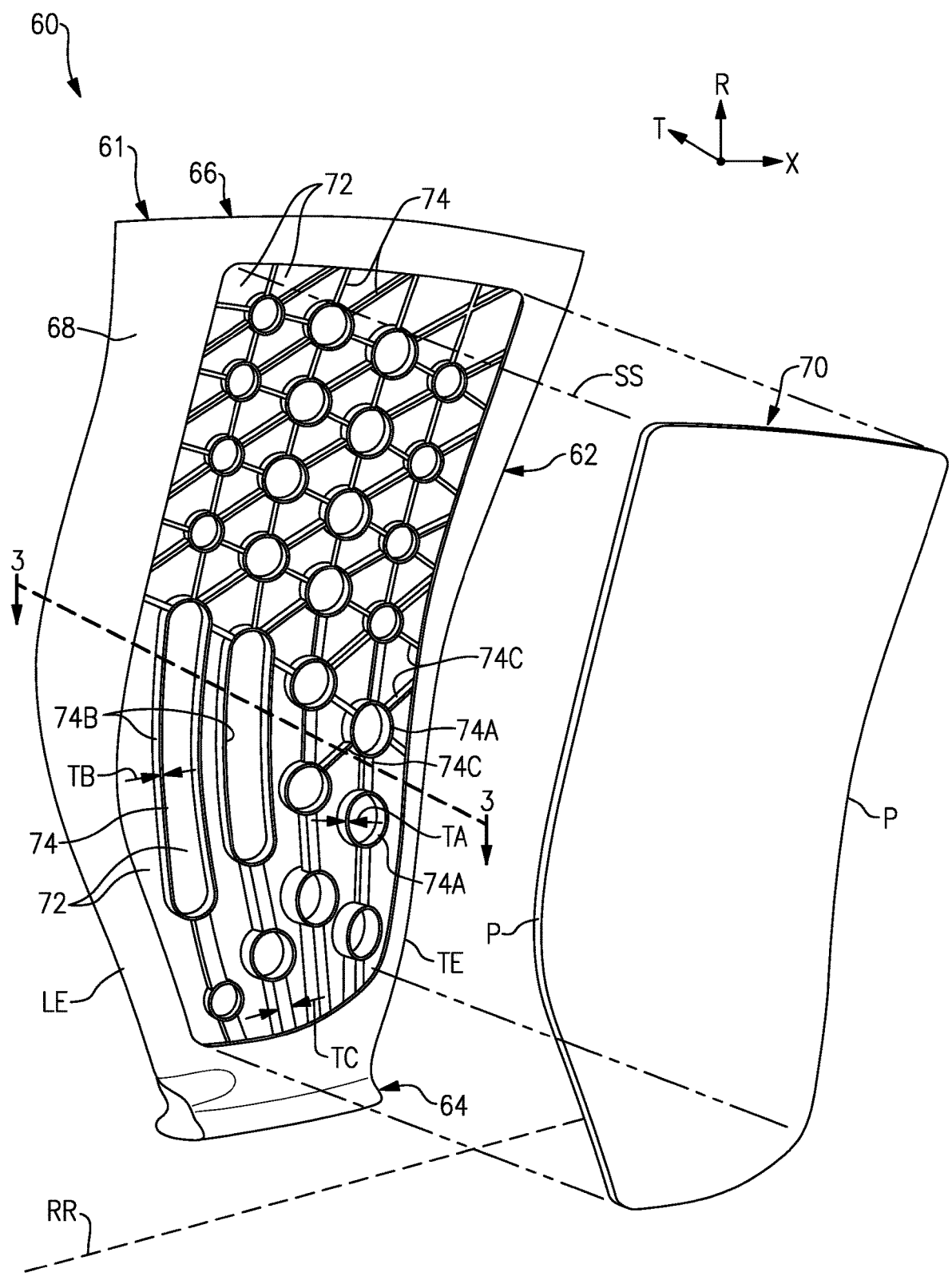
FIG. 2 illustrates a perspective view of an airfoil.

FIG. 2 illustrates a gas turbine engine component 60 according to an example. The component 60 can be incorporated in the gas turbine engine 20 of FIG. 1, for example. In the illustrated example of FIG. 2, the component 60 is an airfoil 61. The airfoil 61 can be a fan blade 42A for the fan 42 of FIG. 1, for example. Other types of airfoils, including blades, vanes and struts in the fan, compressor and turbine sections 22, 24, 28, mid-turbine frame 57 and turbine exhaust case (TEC) 55 (FIG. 1) may benefit from the examples disclosed herein which are not limited to the design shown. Other parts of the gas turbine engine 20 may benefit from the examples disclosed herein, including industrial turbines.

Figure 3:
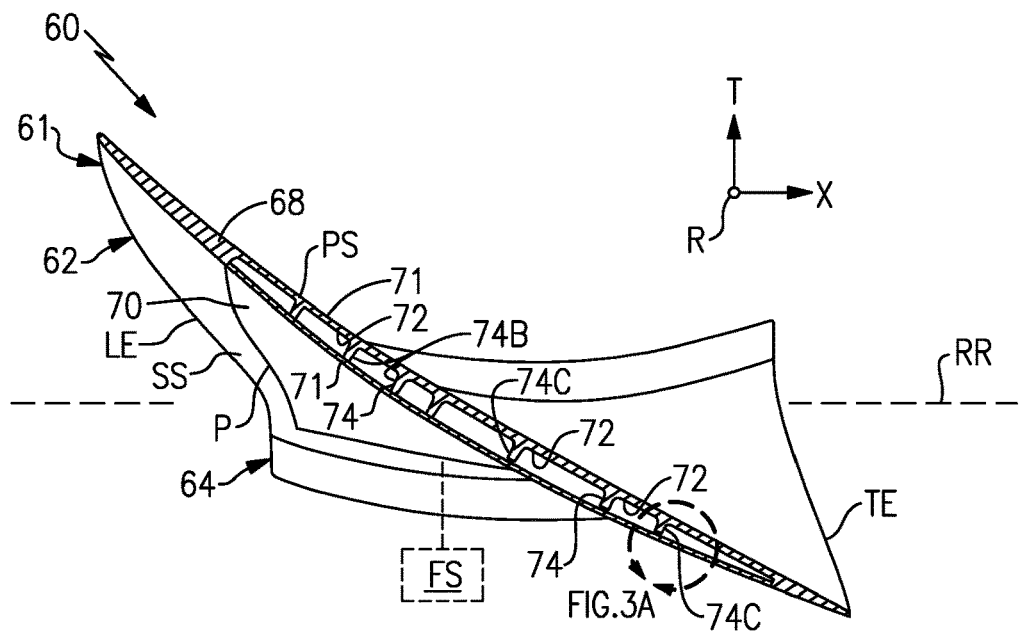
FIG. 3 illustrates a section view of the airfoil taken along line 3-3 of FIG. 2.

The airfoil 61 includes an airfoil section 62 extending in a spanwise or radial direction R from a root section 64. The root section 64 is a shape that is configured to mount the fan blade 42A in the engine 20, such as a dovetail shape. Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour of the airfoil section 62, as illustrated in FIG. 3. The airfoil 61 is rotatable about an axis of rotation RR. The axis of rotation RR can be collinear or parallel to the engine axis A (FIG. 1).

The airfoil section 62 includes a first skin or airfoil body 68 that extends in the radial direction R from the root section 64 to a tip portion 66 (FIG. 3). The tip portion 66 is a terminal end of the airfoil 61. The airfoil body 68 extends in a chordwise direction X between a leading edge LE and a trailing edge TE. The airfoil body 68 defines at least one of the pressure and suction sides PS, SS. In the illustrated example of FIGS. 2 and 3, the airfoil body 68 defines both the pressure and suction sides PS, SS.

The airfoil 61 includes a cover (or second) skin 70 disposed on a surface of the airfoil body 68 and is arranged to provide a continuous surface with the suction side SS of the airfoil 61, as illustrated by FIG. 3. In another example, the cover skin 70 is disposed on the pressure side PS of the airfoil 61. The cover skin 70 is shown in an uninstalled position in FIG. 2 for illustrative purposes. The component 60 can include two or more cover skins along each of the pressure and/or suction sides PS, SS of the airfoil section 62.

The airfoil body 68 and cover skin 70 can be made out of metallic materials such as titanium or aluminum. Other materials for the airfoil body 68 and cover skin 70 can be utilized, including metals or alloys and metal matrix composites.

Referring to FIG. 3 with continuing reference to FIG. 2, the airfoil 61 includes at least one internal cavity 72 defined in the airfoil section 62. In other examples, the internal cavities 72 are omitted such that the airfoil section 62 is substantially or completely solid. In the illustrative example of FIG. 3, the airfoil body 68 includes one or more ribs 74 that define a plurality of internal cavities 72. The airfoil 61 can include fewer or more than three internal cavities 72, such as only one internal cavity 72. Each internal cavity 72 can be defined having different dimensions, shapes and at other orientations than illustrated by FIGS. 2 and 3. The internal cavities 72 can substantially or completely free of any material such that the airfoil section 62 is hollow.

Figure 3A:
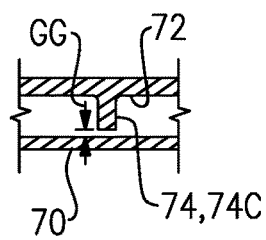
FIG. 3A illustrates selected portions of the airfoil of FIG. 3.

In the illustrated example of FIG. 2, ribs 74A have a generally circular or otherwise elliptical geometry, ribs 74B have generally elongated, oblong or racetrack shaped geometry, and ribs 74C are generally linear or curvilinear. Ribs 74A, 74B and 74C have a thickness TA, TB and TC, respectively. In examples, thicknesses TA, TB are greater than or equal to about 0.03 inches and less than or equal to about 0.125 inches, or more narrowly between 0.06 and 0.09 inches. Thickness TC can be greater than thicknesses TA, TB, such as between 0.25 and 0.625 inches, for example. Ribs 74A, 74B can be attached to the cover skin 70 utilizing any of the techniques disclosed herein, including laser or electron beam welding, brazing, diffusion bonding or other fastening techniques. At least some of the ribs 74 can be spaced apart from the cover skin 70 to define a gap GG when in an assembled position, as illustrated by rib 74C of FIG. 3A.

Walls 71 of the component 60 bound the internal cavities 72. The walls 71 can be internal or external walls of the component 60. The airfoil body 68 and cover skin 70 define one or more of the walls 71. The cover skin 70 is attached to the airfoil body 68 to enclose or otherwise bound the internal cavities 72, with the airfoil body 68 and cover skin 70 cooperating to define the pressure and suction sides PS, SS of the airfoil section 62.

Figure 4:
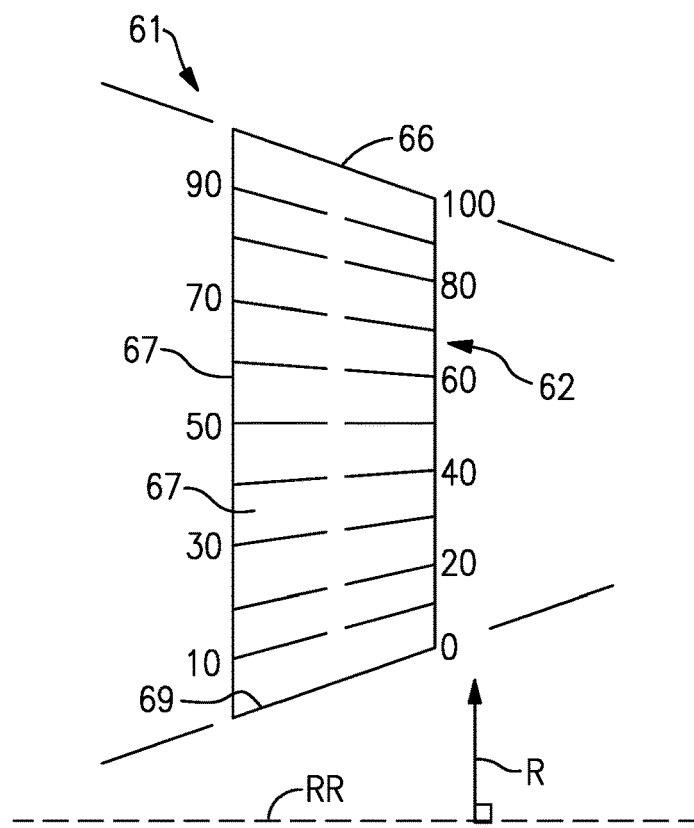
FIG. 4 is a schematic view of airfoil span positions.

Referring to FIG. 4, span positions of the airfoil section 62 are schematically illustrated from 0% to 100% in 10% increments to define a plurality of sections 67. Each section 67 at a given span position is provided by a conical cut that corresponds to the shape of segments a flowpath (e.g., bypass flowpath B or core flow path C of FIG. 1), as shown by the large dashed lines. In the case of an airfoil 61 such as with an integral platform 69, the 0% span position corresponds to the radially innermost location where the airfoil section 62 meets the fillet joining the airfoil 61 to the platform 69 (see also FIG. 1 illustrating platform 69). In the case of an airfoil 61 without an integral platform, the 0% span position corresponds to the radially innermost location where the discrete platform 69 meets the exterior surface of the airfoil section 62. A 100% span position corresponds to a section of the airfoil section 62 at the tip portion 66.

Figure 5:
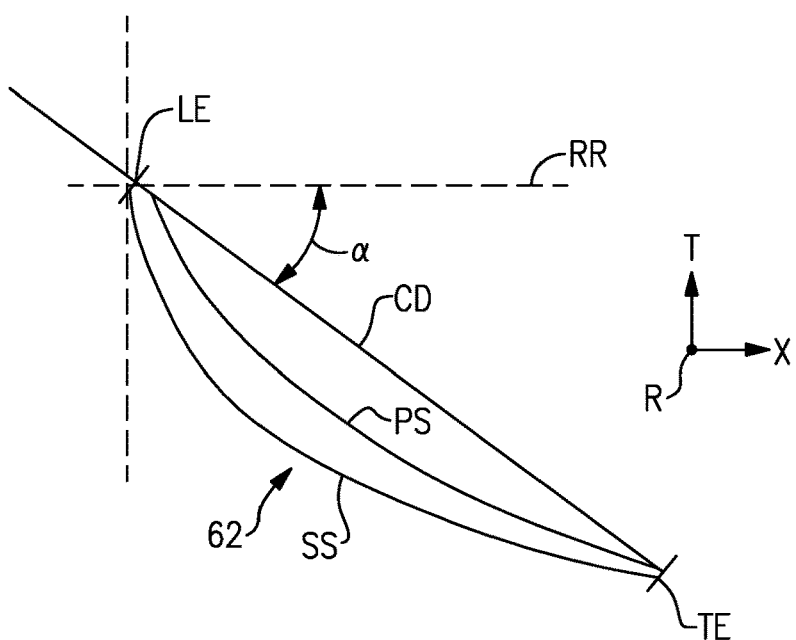
FIG. 5 is a schematic view of an airfoil depicting a stagger angle at a span position of FIG. 4.

Referring to FIG. 5 with continuing reference to FIG. 4, the airfoil section 62 is sectioned at a radial position between the root section 64 and tip portion 66. In examples, each airfoil section 62 is specifically twisted about a spanwise axis in the radial direction R with a corresponding stagger angle α at each span position. Chord CD, which is a length between the leading and trailing edges LE, TE, forms stagger angle α relative to the chordwise direction X or a plane parallel to the axis or rotation RR. The stagger angle α can vary along the span of the airfoil section 62 to define a twist. For example, the tip portion 66 can define a stagger angle α relative to the root section 64 that is greater than or equal to 5 degrees or 10 degrees, absolute. In some examples, the stagger angle α at the tip portion 66 relative to the root section 64 is between 5-60 degrees, absolute, or more narrowly between 10-30 degrees, absolute, such that the airfoil section 62 is twisted about a spanwise axis as illustrated by the airfoil 61 of FIGS. 2 and 3. The airfoil section 62 can be three-dimensionally twisted about the spanwise axis.

Figure 6:
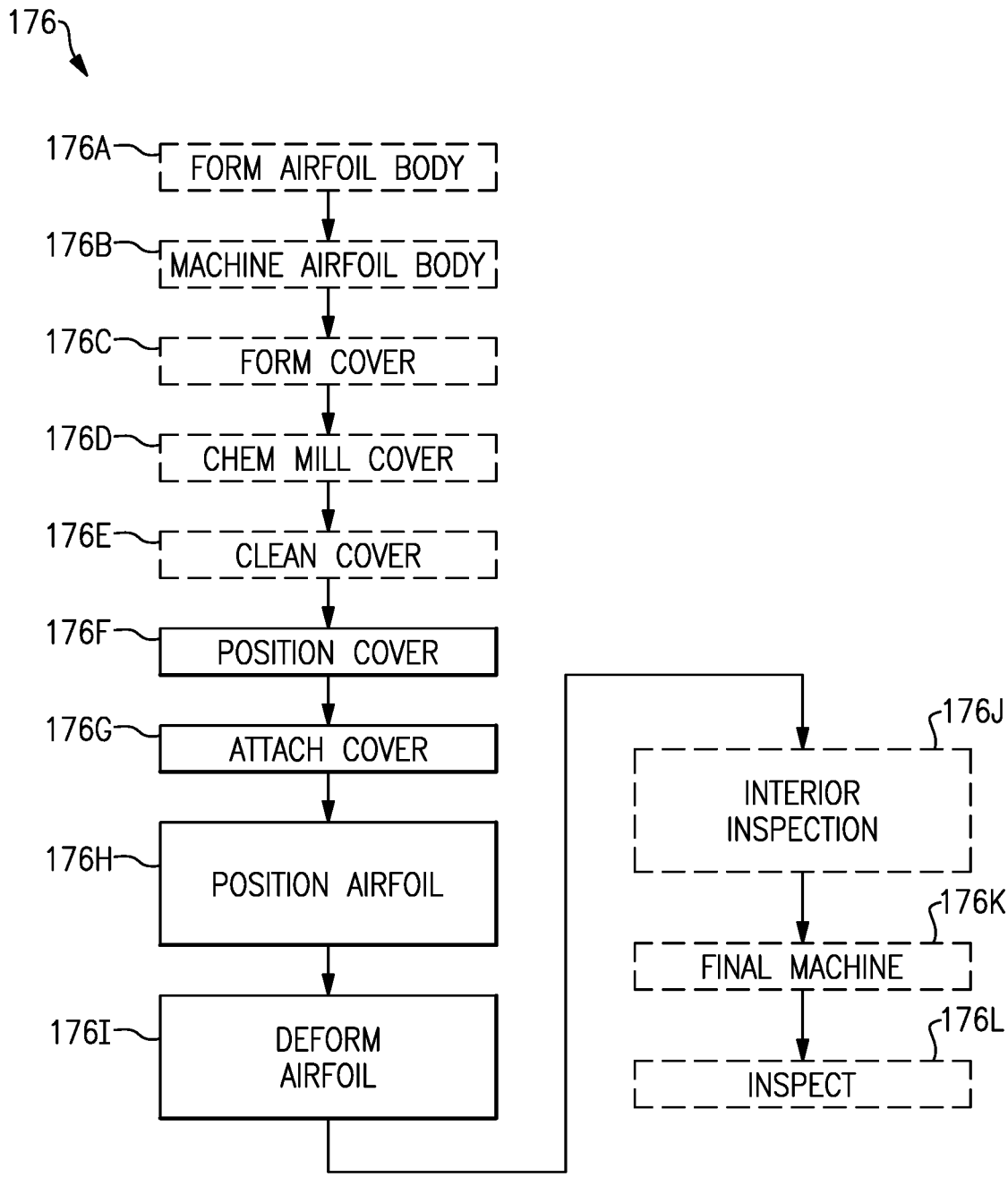
FIG. 6 illustrates a process for forming a gas turbine engine component.

FIG. 6 illustrates a process of constructing or forming a gas turbine engine component in a flow chart 176. The process can be utilized to form the component 60 of FIGS. 2 and 3, including an airfoil 61 such as fan blade 42A, another hollow airfoil, or a solid airfoil, for example. In this disclosure, like reference numerals designate like elements where appropriate and reference numerals with the addition of one-hundred or multiples thereof designate modified elements that are understood to incorporate the same features and benefits of the corresponding original elements. Reference is made to component 160 of FIGS. 7-8 for illustrative purposes, which disclose exemplary conditions or states of the component 160 in the process 176. In the illustrative example of FIGS. 7-8, the component 160 is a hollow airfoil 161 or fan blade including a metallic airfoil section 162. The techniques disclosed herein can be utilized to form a new component or to repair a previously fielded component.

Figure 7:
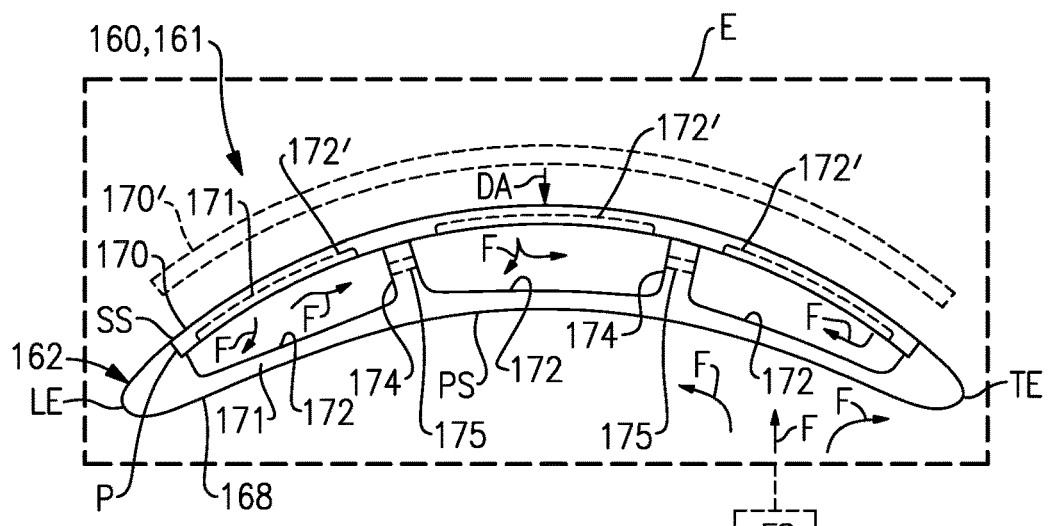
FIG. 7 illustrates attachment of portions of a gas turbine engine component.

Referring to FIGS. 6-7, one or more portions of the component 160 can be prepared or otherwise provided at steps 176A-176E (shown in dashed lines). The component 160 includes a first skin or airfoil/main body 168 and a cover (or second) skin 170 that define one or more walls 171 of the component 160.

At step 176A, airfoil body 168 is formed with respect to a predefined blade geometry, which can be defined with respect to one or more design criteria. The airfoil body 168 can be forged, cast, or produced by additive manufacturing from a metal or metal alloy, for example. At step 176B, internal and/or external surfaces of the airfoil body 168 are machined with respect to the predefined blade geometry. At step 176C, cover skin 170 is hot formed with respect to a predefined cover geometry. The cover skin 170 can be formed from sheet metal, for example. At step 176D, the cover skin 170 is chemically milled with respect to the predefined cover geometry. At step 176E, the cover skin 170 is cleaned to remove surface contaminants using a laser cleaning technique, for example.

One or more internal cavities 172 are formed in the airfoil body 168 and/or the cover skin 170 (internal cavities 172' defined in cover skin 170 shown in dashed lines for illustrative purposes). Ribs 174 can be arranged to define various geometries of the internal cavities 172, including any of the geometries of ribs 74 of FIG. 2.

Various techniques can be utilized to form the internal cavities 172, including casting, machining or additive manufacturing techniques. The internal cavities 172 can be defined in the airfoil body 168 and/or cover skin 170 during steps 176A-176C, for example. The cover skin 170 is dimensioned to enclose at least one, or more than one, internal cavity 172 in the airfoil body 168 when in an installed position.

At step 176F, cover skin 170' is positioned relative to the airfoil body 168. Cover skin 170' is shown in dashed lines in FIG. 7 at a distance away from the airfoil body 168 for illustrative purposes. The positioning can include moving the cover skin 170' in a direction DA and into abutment with ribs 174 of the airfoil body 168 to define a pre-finished state of the airfoil section 162, as illustrated by cover skin 170.

At step 176G, the cover skin 170 is attached to the airfoil body 168 to define the airfoil 161. In examples, a perimeter P (see also FIGS. 2-3) of the cover skin 170 and/or locations of the cover skin 170 abutting the ribs 174 are attached to the airfoil body 168 to enclose or otherwise bound the internal cavities 172. Various techniques can be utilized to attach the cover skin 170 to the airfoil body 168, including laser or electron beam welding, brazing, diffusion bonding or other fastening techniques. The predefined blade and cover geometries can be set with respect to an expected distortion in the airfoil 161 caused by attachment of the airfoil body 168 and cover skin 170 during the attaching step 176G.

In examples, the airfoil body 168 extends from a root section to a tip portion (e.g., root section 64 and tip portion 66 of FIGS. 2-3) to define a stagger angle α (FIG. 5) such that the airfoil body 168 is twisted. The stagger angle α of the airfoil section 162 can include any of the stagger angles α disclosed herein, such as being greater than or equal to 10 degrees, absolute, at the airfoil tip relative to the root section prior to attaching the cover skin 170 at step 176G.

Attaching the cover skin 170 can include trapping an inert gas in each internal cavity 172. In the illustrated example of FIG. 7, the component 160 can be situated in a controlled environment E (shown in dashed lines) prior to and during the attaching step 176G. A fluid source FS (shown in dashed lines) is operable to convey an amount of fluid F to the environment E. Example fluids F include inert gases such as argon or helium. The fluid F circulates in the environment E and is communicated to the internal cavities 172. Attaching the cover skin 170 to the airfoil body 168 can cause an amount of the fluid F to be trapped in the internal cavities 172. In other examples, fluid F is communicated to the internal cavities via passages in the root section (see, e.g., root section 64, cavities 72 and fluid source FS of FIG. 3). Walls of the ribs 174 can include one or more vent holes 175 (shown in dashed lines in FIG. 7) at approximately midpoint within the rib 174, for example, to permit equalization of pressure of the trapped inert gases between adjacent internal cavities 172 during attaching step 176G.

Figure 8:
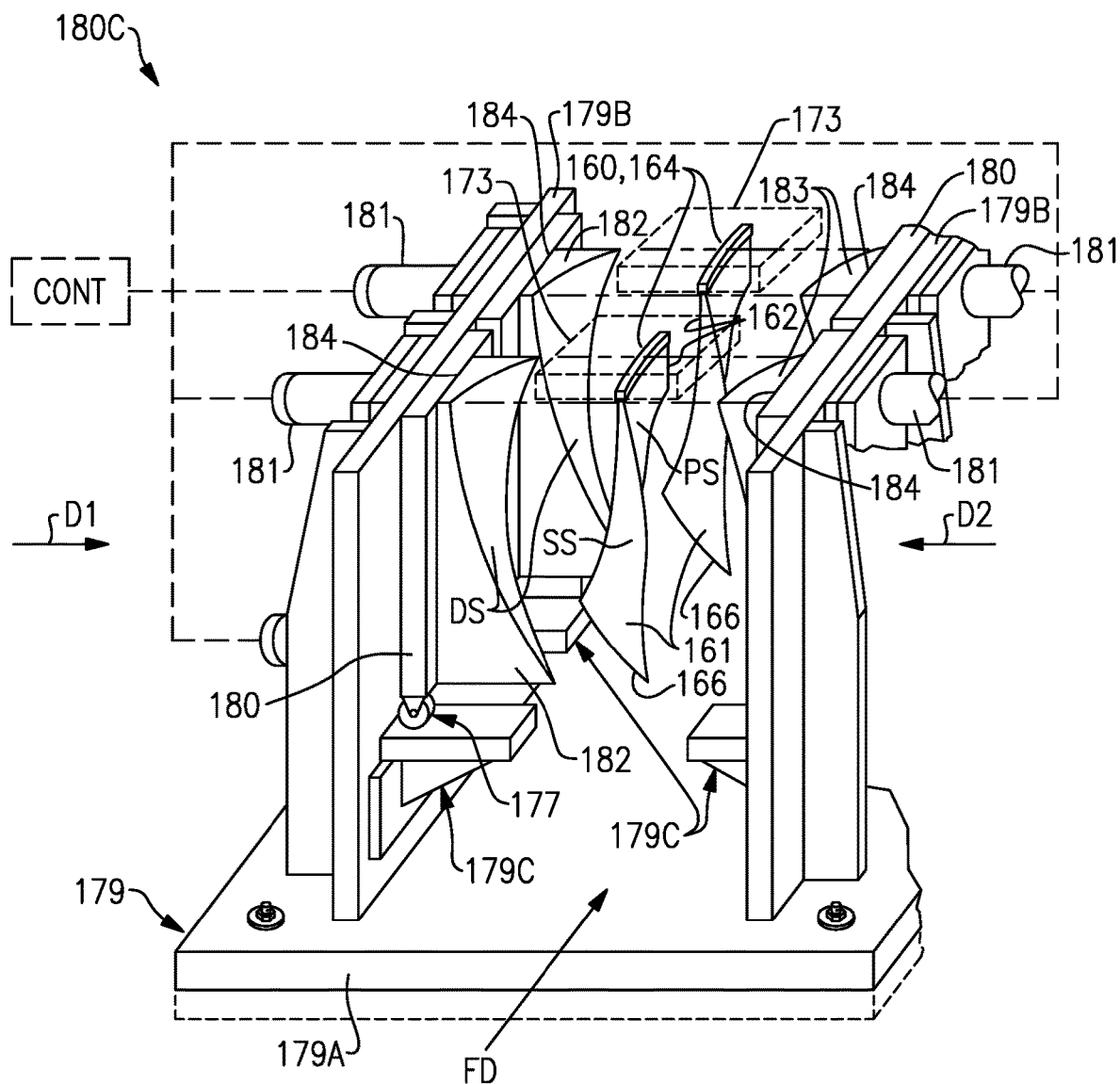
FIG. 8 illustrates a perspective view of a gas turbine engine components positioned between sets of dies of a forming machine.

Referring to FIGS. 6 and 8, at step 176H at least one component 160 such as airfoil 161 is moved or otherwise positioned in a forming assembly or machine 178 subsequent to the attaching step 176G. The machine 178 includes a support 179 dimensioned to at least partially receive the component(s) 160. The support 179 includes a base 179A and a pair of structural plates 179B fixedly attached or otherwise coupled to the base 179A. The base 179A is mounted to a static structure 151 (shown in dashed lines for illustrative purposes), which may be a factory floor, for example, utilizing one or more fasteners. The structural plates 179B have a generally rectangular geometry and extend substantially perpendicular to the base 179A such that the structural plates 179B oppose each other.

Figure 9:
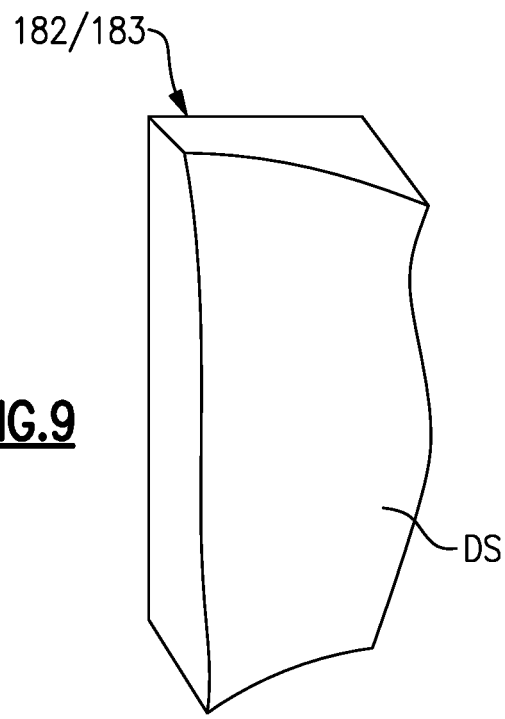
FIG. 9 illustrates an example die.
Figure 11:
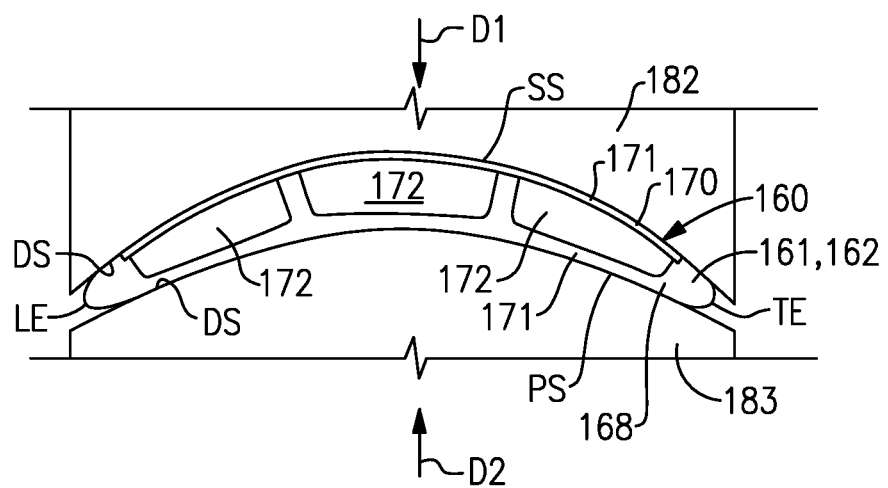
FIG. 11 illustrates one of the gas turbine engine components held between the dies of FIG. 8.

The machine 178 includes one or more pairs of forming dies (or die halves) 182, 183 and one or more pairs of mounting plates 180. The dies 182, 183 include respective die surfaces DS (FIGS. 8, 9 and 11) dimensioned with respect to a predefined contour of the component 160. The die surfaces DS are dimensioned according to respective portions of the predefined contour. In examples, the die surfaces DS are contoured to respectively mate with pressure and suction sides PS, SS of the airfoil 161, as illustrated by FIG. 11.

The mounting plates 180 are mechanically attached to the respective dies 182, 183 along respective interfaces 184 such that the dies 182, 183 in each pair of oppose one another. In the illustrative example of FIG. 8, each mounting plate 180 is mechanically attached to one of the dies 182, 183. In other examples, each mounting plate 180 is attached to more than one of the dies 182, 183. The mounting plates 180 are dimensioned to space apart the dies 182, 183 from the structural plates 179B.

Figure 8A:
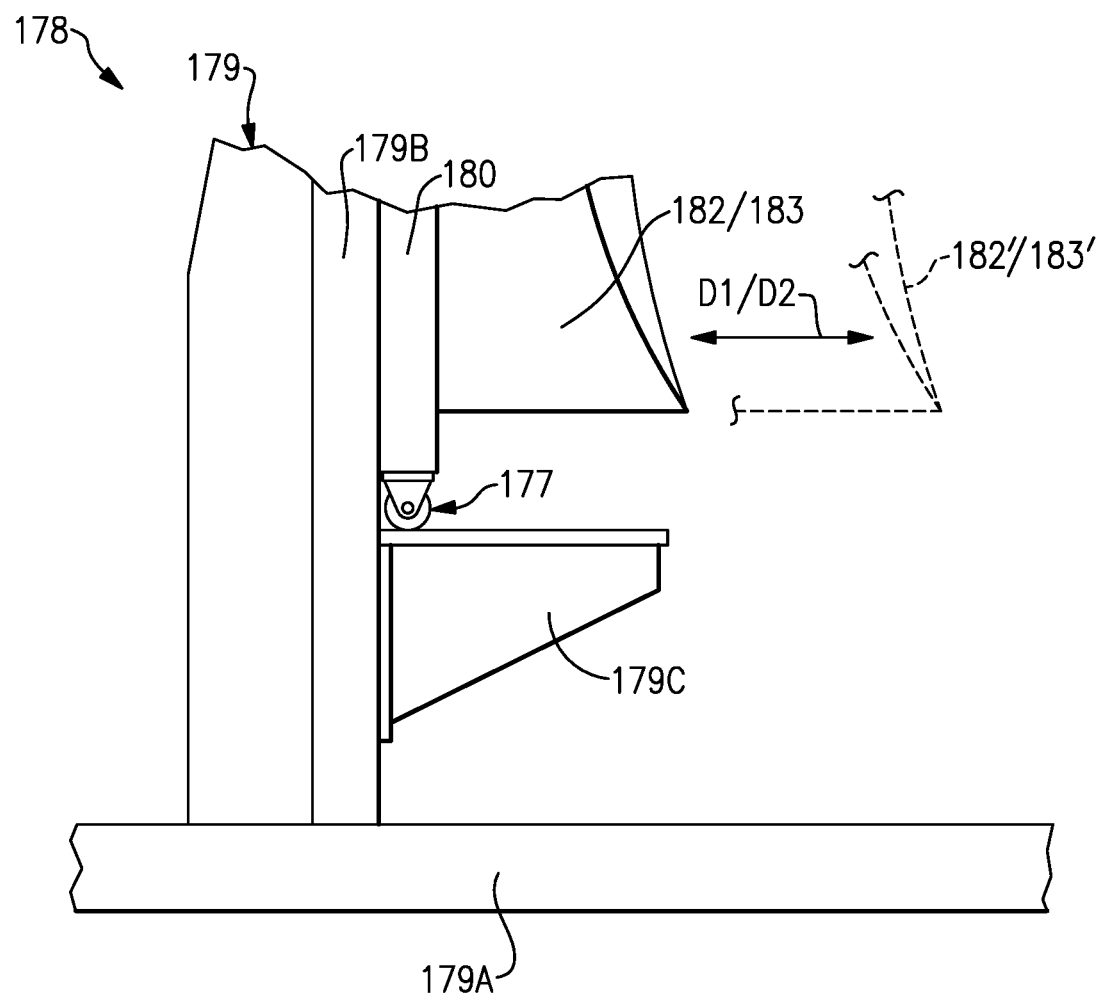
FIG. 8A illustrates a side view of the machine of FIG. 8.

The support 179 can include gusseted supports or shelves 179C extending outwardly from the structural plates 179B. In the illustrative example of FIGS. 8 and 8A, rollers 177 are fixedly attached to a bottom of each mounting plate 180 to support the mounting plate 180 on the shelf 179C. Each die 182, 183 is movable in opposed directions D1, D2 between a first position and a second position (indicated by dashed lines at 182'/183' in FIG. 8A for illustrative purposes) in response to movement of the mounting plate 180 relative to the respective shelf 179C.

Each airfoil 161 can be positioned in a support fixture 173 (shown in dashed lines for illustrative purposes). The support fixture 173 is moved in a direction FD to position the airfoil section 162 between respective a pair of the dies 182, 183.

The airfoil 161 can be positioned in a root upward orientation in the machine 178, as illustrated by FIG. 8. The airfoils 161 are suspended or otherwise supported by respective root sections 164 in the support fixture 173 generally residing above the machine 178 such that the airfoils 161 are oriented substantially vertically between the dies 182, 183. Tip portions 166 of the airfoils 161 are positioned downward or otherwise below respective root section 164. Vertically orienting the airfoils 161 in a root upward orientation can reduce spanwise distortions such as buckling during heating and cooling of the airfoils 161.

The machine 178 includes one or more actuators 181 (e.g., two pairs) each coupled to one of the mounting plates 180. A housing of each actuator 181 is mounted to one of the structural plates 179B. The actuators 181 are operable to move the mounting plates 180 together with the dies 182, 183 relative to the base 179A and structural plates 179B in response to signal(s) from a controller CONT (shown in dashed lines).

The dies 182, 183 are moved in opposed directions D1, D2 (FIGS. 8 and 11) towards and into abutment with respective pressure and suction sides PS, SS of the airfoil 161 such that the component 160 is held between the dies 182, 183, as illustrated by FIG. 11. The dies 182, 183 are operable to heat the components 160 to a predefined or predetermined temperature threshold during holding the components 160 under compression by applying pressure from the actuators 181. For example, the dies 182, 183 can be heated to and continuously operated at a temperature of at least 1200 degrees Fahrenheit (F), or more narrowly between approximately 1300 and 1600 degrees Fahrenheit (F). The dies 182, 183 can be pre-heated prior to moving the dies 182, 183 into contact with the component 160.

Figure 10:
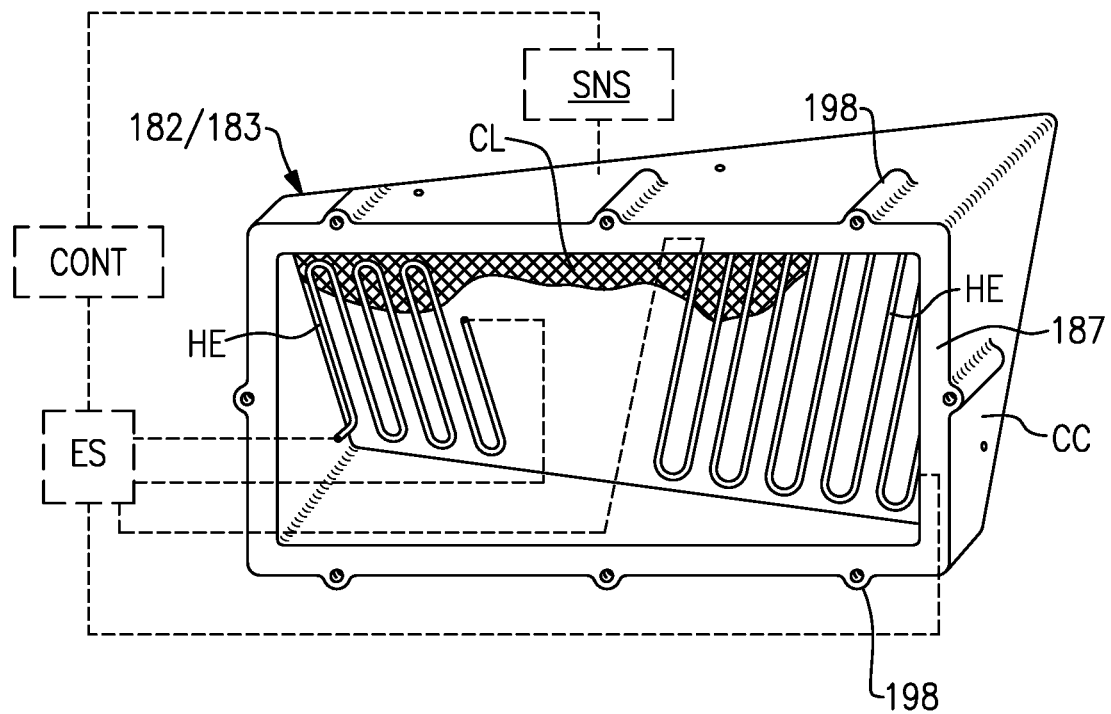
FIG. 10 illustrates a perspective view of one of the dies of FIG. 8.

FIG. 10 illustrates a backside of one of the dies 182/183 according to an example. One or more heating elements HE are coupled to the die 182/183. Each heating element HE can be positioned in a backside cavity of the die 182/183 to conductively heat the die 182/183, as illustrated in FIG. 10. Each die 182/183 can be made of metal or a metal alloy, such as a cast nickel alloy which can improve the ability of continuously operating the dies 182, 183 at or above the predetermined temperature threshold.

A non-metallic heat conductive layer CL such as cloth can be situated between the heating elements HE and surfaces of the die 182/183 to reduce a likelihood of arcing. At least one coating CC can be deposited on surfaces of the die 182/183. Example coatings include diffused aluminide which can provide oxidation protection.

Each heating element HE can be a heating coil that is coupled to an energy source ES (shown in dashed lines). The energy source ES can be a power supply operable to communicate electrical current to the heating element HE in response to controller CONT to heat the respective die 182/183 to the predetermined temperature threshold. The controller CONT can be coupled to at least one sensor SNS (shown in dashed lines), such as a thermocouple, to monitor surface temperatures of the respective die 182/183. The controller CONT is operable to adjust the temperature of the die 182/183 to maintain or otherwise approach the predetermined temperature threshold. One would understand how to program or configure the controller CONT with logic to communicate with and control the actuators 181, energy source ES and sensor(s) SNS according to the teachings disclosed herein.

The machine 178 is operable to cause the airfoil section 162 of each airfoil 161 to deform or resize between the dies 182, 183. Referring to FIGS. 6, 8 and 11, at step 176I the component 160 undergoes permanent deformation to vary a geometry of the walls 171 of the airfoil body 168 and/or cover skin 170 (FIGS. 7 and 11). Subsequent to bringing the dies 182, 183 into abutment with the component 160, the dies 182, 183 can be moved to exert a pressure on surfaces of the airfoil section 162 sufficient to cause a predetermined amount of deformation to occur.

Each airfoil section 162 is clamped or held in compression between the dies 182, 183 approximately at or above the predetermined temperature threshold for a predetermined duration, such as approximately 20-30 minutes, to cause the airfoil section 162 to permanently deform between the dies 182, 183 with respect to the predefined contour. The predetermined duration can be set to cause the airfoil section 162 to undergo creep deformation or hot sizing, to minimize or otherwise reduce the residual stresses in the component 160 that may be caused during the attaching step 176G, and to allow the walls 171 of the component 160 to conform to the surface profile defined by the die surfaces DS of the dies 182, 183.

In examples, the deformation of the airfoil section 162 can occur such that a change in the stagger angle $\alpha$ (see FIG. 5) of the of airfoil 162 that is presented to the machine 178 is no more than approximately 1 or 2 degrees, absolute, at the tip portion relative to the root section. The deformation due to hot sizing the component 160 can be less than about 0.1 inches, for example. For the purposes of this disclosure, the terms "approximately" and "substantially" mean±3% of the value unless otherwise disclosed.

The dies 182, 183 can serve as "gas sizing" dies that are utilized to cause at least a portion of the component 160 to undergo deformation. Creep deformation, hot sizing and gas sizing are generally known. However, utilization of such techniques to form the components in situ as disclosed herein are not known. For example, heating of the fluid F trapped in the internal cavities 172 (FIG. 7) of the component 160 during the attaching step 176G causes the internal cavities 172 to pressurize and the walls 171 of the airfoil section 162 to move outwardly or otherwise deform during the deforming step 176I. The techniques disclosed herein can be utilized to rapidly dimensionally correct the components 160 subsequent to welding or otherwise attaching the various portions of the components 160.

The components 160 are unloaded or removed from the machine 178 subsequent to step 176I. One or more finishing steps can be performed subsequent to unloading or removing the components 160 from the machine 178. For example, an interior inspection of the component 160 can occur at step 176J. One or more final machining operations of the component 160 can occur at step 176K. A final inspection of the component 160 can occur at step 176L.

As previously discussed, the dies 182, 183 are subject to elevated temperatures during formation of the component 160. The mounting plates 180 can provide a thermal path between the dies 182, 183 and other portions of the machine 178, including the actuators 181 and support 179, which may otherwise need to be designed to withstand the elevated temperatures during operation.

Figure 12:
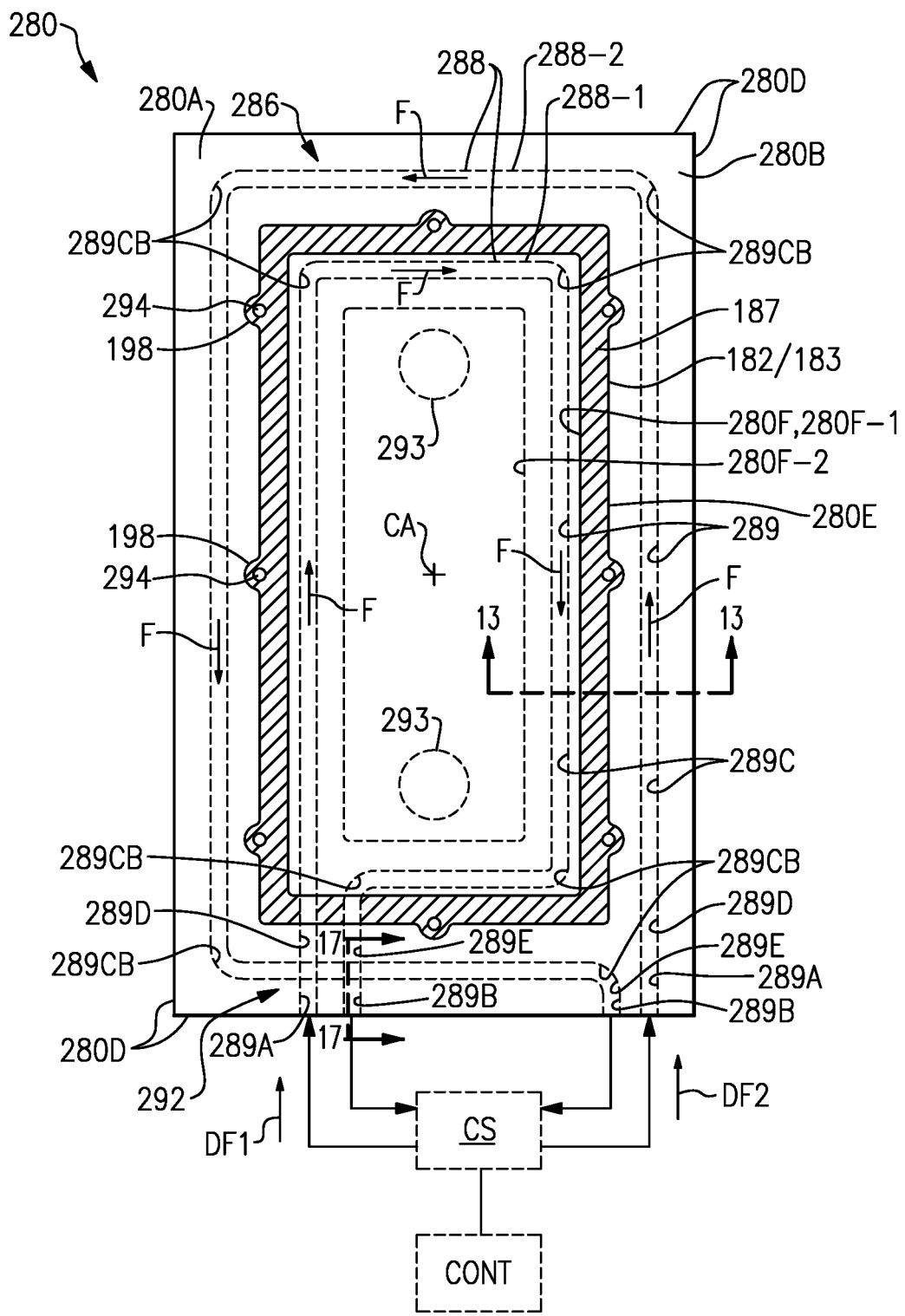
FIG. 12 illustrates a plan view of a mounting plate and a sectional view of a die according to an example.
Figure 13:
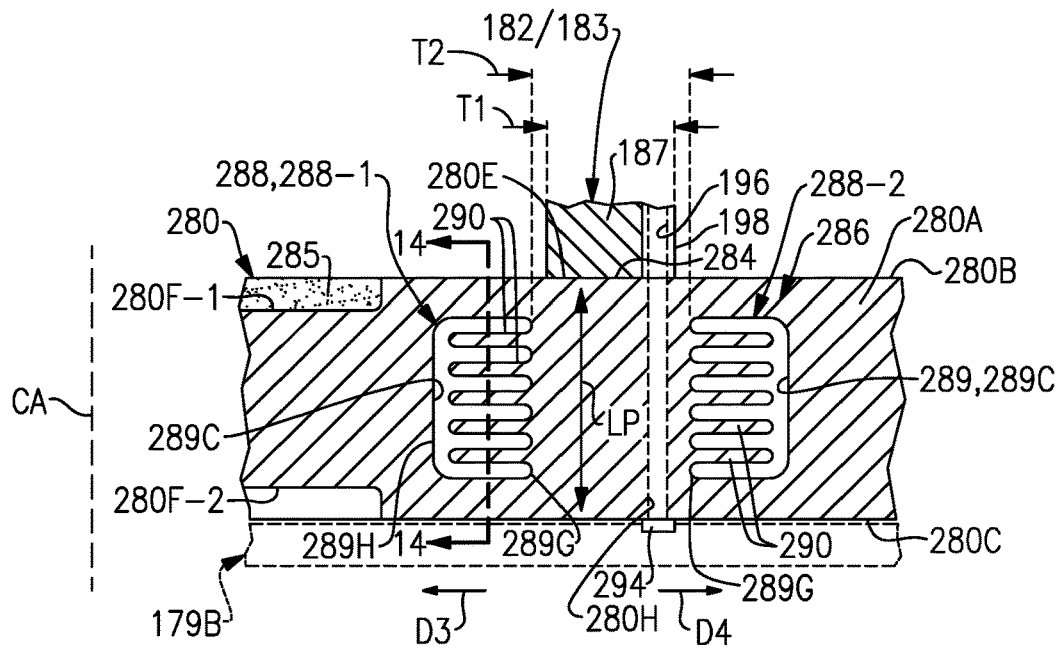
FIG. 13 illustrates a sectional view of the mounting plate taken along line 13-13 of FIG. 12.
Figure 14:
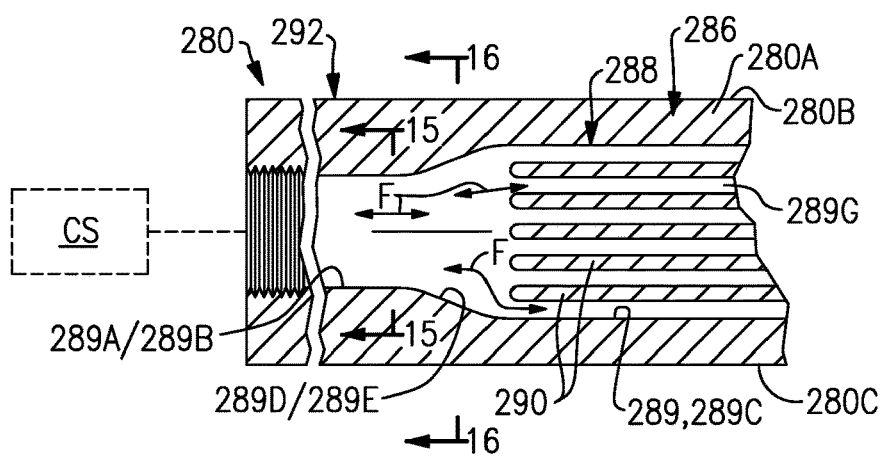
FIG. 14 illustrates a sectional view of the mounting plate taken along line 14-14 of FIG. 13.

FIGS. 12-14 illustrate a mounting plate 280 for forming a gas turbine engine component according to an example. FIGS. 12-13 illustrate a forming die 182/183 mechanically attached to the mounting plate 280. The mounting plate 280 can be incorporated into the forming machine 178 of FIG. 8 and process 176 of FIG. 6, for example. Reference is made to the machine 178 including dies 182/183 and process 176 for illustrative purposes. The mounting plate 280 includes one or more features that at least partially thermally isolate or reduce elevated temperatures from being communicated from the dies 182, 183 to other portions of the machine 178, which can reduce cost and complexity. The mounting plates 280 disclosed herein can be utilized to form gas turbine engine components, including any of the components disclosed herein. Other systems can benefit from the teachings disclosed herein, including systems that form components at elevated temperatures.

Referring to FIGS. 12-13, the mounting plate 280 includes a plate body 280A that extends between a top (or first) surface 280B and a bottom (or second) surface 280C (FIG. 13) opposed to the top surface 280B. The plate body 280A extends between opposed sidewalls 280D (FIG. 12). The plate body 280A defines an abutment 280E along the top surface 280B that cooperates with the die 182/183 to establish an interface 284 (FIG. 13). The abutment 280E is dimensioned to mate with, and have a complementary geometry with, outer wall 187 defining a perimeter or footprint of the die 182/183 along the interface 284, as illustrated in FIG. 12 (see also FIG. 10). The respective die 182/183 is mounted to the mounting plate 280 along the abutment 280E.

The die 182/183 can be mounted to the mounting plate 280 utilizing various techniques. In the illustrative example of FIG. 13, fasteners 294 (one shown for illustrative purposes, see also FIG. 12) are received in a respective throughbore 280H defined in the mounting block 280 and in a respective inner bore 196 defined in a protruding portion 198 (see also FIGS. 10 and 12) of the outer wall 187 of the die 182/183. In other examples, the protruding portions 198 are omitted, and fasteners are received in a thickness of the outer wall 187.

Figure 19:
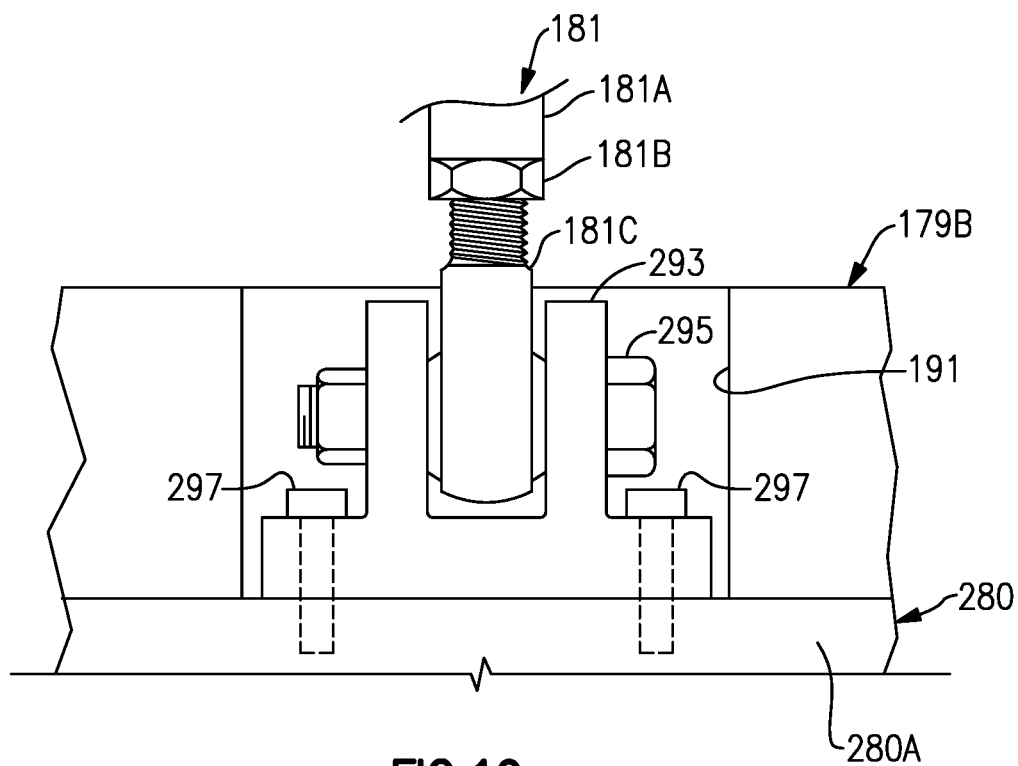
FIG. 19 illustrates a mounting arrangement of the mounting plate of FIG. 12.

Various techniques can be utilized to attach the mounting plate 280 to the actuator 181 (FIG. 8). In the illustrative example of FIG. 19, the mounting plate 280 is mechanically attached to a moveable portion of the actuator 181. The actuator 181 includes a translatable actuator rod 181A, locknut 181B and uniball rod end 181C. The actuator rod 181A is dimensioned to extend through an access hole or opening 191 in the structural plate 179B. A clevis 293 (also shown in dashed lines in FIG. 12 for illustrative purposes) is mechanically attached to the rod end 181C utilizing a fastener 295. The clevis 293 is mechanically attached to the plate body 280A utilizing fastener(s) 297.

Referring back to FIGS. 12 and 13, the bottom 280C of the mounting plate 280 can be dimensioned to abut or rest against the structural plate 179B (shown in dashed lines in FIG. 13 for illustrative purposes) prior to moving the mounting plate 280 towards the component to be formed. Heating the die 182/183 causes conductive heating of adjacent portions of the mounting plate 280 due to direct contact between the outer wall 187 of the die 182/183 and the top surface 280B of the mounting plate 280.

The plate body 280A can define at least one recess 280F extending inwardly from at least one of the top and bottom surfaces 280B, 280C. In the illustrative example of FIGS. 12-13, the plate body 280A defines two recesses 280F (indicated at 280F-1, 280F-2) on opposed sides of the plate body 280A. Recess 280E-1 extends inwardly from an opening along the top surface 280B, and recess 280F-2 extends inwardly from an opening along the bottom surface 280C. Each opening of the recesses 280F can be surrounded by the abutment 280E or interface 284, as illustrated by FIG. 12. The recesses 280F reduce a mass of the mounting plate 280 and reduce direct contact between surfaces of the die 182/183 and mounting plate 280, which can reduce communication of heat from the die 182/183 to other portions of the machine 178 (FIG. 8), including the structural plate 179B and actuators 181. The recesses 280F can be at least partially or completely filled with insulation material 285 such as a ceramic-based material, as illustrated by recess 280F-1 of FIG. 13, to further thermally isolate the die 182/183.

In examples, each die 182/183 is made of a first material, and each mounting plate 280 is made of a second material, which can be the same or can differ from the first material. Example materials of the mounting plate 280 can include metals and alloys such as stainless steel and nickel-based alloys. The structural plate 179B can be made of a metal material such as steel, for example. Although the materials of the die 182/183, mounting plate 280 and/or structural plate 179B can differ, the materials can be selected to match or otherwise reduce a difference in thermal expansion rates.

The mounting plate 280 defines a cooling scheme 286 to cool portions of the plate body 280A and surrounding structure. The cooling scheme 286 includes at least one internal cooling circuit 288 defined in a thickness of the plate body 280A. In the illustrative example of FIGS. 12 and 13, the cooling scheme 286 includes inner and outer (or first and second) circuits (indicated at 288-1, 288-2) fluidly isolated from each other within the plate body 280A.

Each cooling circuit 288 includes a passageway 289 in communication with a coolant (or fluid) source CS. The coolant source CS is operable to convey or communicate an amount of coolant or fluid F to each passageway 289 to cool or decrease a temperature of adjacent portions of the mounting plate 280 to a steady-state temperature or threshold. Example coolant or fluid F can include water or a water-based coolant with chemical additive(s) to increase conductivity, reduce mold and/or reduce corrosion. In examples, the coolant source CS is a recirculation system including a pump, one or more flexible conduits, and a chiller to reduce a temperature of the fluid F.

The coolant source CS can be coupled to controller CONT (shown in dashed lines in FIG. 12 for illustrative purposes). The controller CONT can be programmed with logic to cause the coolant source CS to modulate the flow of fluid F through each cooling circuit 288 based on one or more criterion, such as the predetermined temperature threshold and surface temperature of the respective die 182/183. Communication of the fluid F to each passageway 289 can occur prior to, during and/or after heating the die 182/183 during the deforming step 176I (FIG. 6).

The passageway 289 includes an inlet portion 289A, an outlet portion 289B and an intermediate portion 289C that interconnects the inlet and outlet portions 289A, 289B. The inlet and outlet portions 289A, 289B are dimensioned to fluidly couple the passageway 289 to the coolant source CS. The inlet and outlet portions 289A, 289B can extend from respective openings or ports along one of the sidewalls 280D of the mounting plate 280, as illustrated by FIGS. 12 and 14. Each circuit 288 can be dimensioned to have a substantially constant cross-sectional area along a length of the respective passageway 289.

In the illustrated example of FIG. 12, each intermediate portion 289C is dimensioned to follow a perimeter of the abutment 280E. The intermediate portion 289C includes a plurality of bends 289CB to form a loop between the inlet and outlet portions 289A, 289B. Each intermediate portion 289C includes four bends 289CB, although fewer or more than four bends 289CB can be utilized in accordance with the teachings disclosed herein. For example, the intermediate portion 289C can be free of any bends such that the intermediate portion 289C is substantially straight between the inlet and outlet portions 289A, 289B. Each bend 289CB can define an angle of at least 45 degrees, such as approximately 90 degrees. Each intermediate portion 289C extends at least 180 degrees about a central axis CA of the mounting plate 280, or more narrowly between 270 and 345 degrees about the central axis CA. The central axis CA extends through the top and bottom surfaces 280B, 280C and is defined relative to the sidewalls 280D of the mounting plate 280.

The cooling scheme 286 is arranged in the plate body 280A such that the intermediate portions 289C of the inner and outer circuits 288-1, 288-2 are arranged or defined on opposed sides of the abutment 280E, as illustrated in FIG. 12. Each intermediate portion 289C is spaced apart from a center of the abutment 280E for at least a majority of positions along the intermediate portion 289C such that the plate body 280A provides or defines a direct, rigid load path LP (FIG. 13) between the abutment 280E and the bottom 280C of the mounting plate 280. As illustrated in FIG. 13, the outer wall 187 of the die 182/183 defines a thickness or distance T1. The intermediate portions 289C of the cooling circuits 288 are spaced apart by a distance T2. The distances T1, T2 can be the same or can differ. In the illustrative example of FIG. 13, the distance T2 is greater than or equal to the distance T1 to provide the load path LP. In examples, the distance T2 is no more than twice the distance T1.

The cooling circuits 288 are coupled to the coolant source CS such that fluid F circulates in the inner cooling circuit 288-1 in a direction DF1 and circulates in the outer cooling circuit 288-2 in a direction DF2 (FIG. 12). The direction DF1 (e.g., clockwise) can be generally opposed to the direction DF2 (e.g., counterclockwise) about the central axis CA such that the cooling scheme 286 defines a counter-flow arrangement, as illustrated by FIG. 12. In other examples, directions DF1, DF2 are generally the same about the central axis CA such that the cooling scheme 286 defines a co-flow arrangement.

Figure 15:
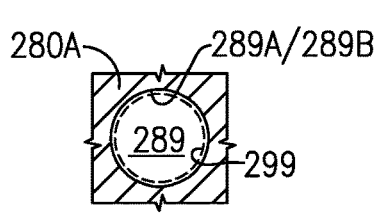
FIG. 15 illustrates a sectional view of the mounting plate taken along line 15-15 of FIG. 14.

A cross-sectional geometry of the inlet and outlet portions 289A, 289B can differ from a cross-sectional geometry of the intermediate portion 289C. In the illustrative example of FIG. 13, the intermediate portion 289C has a generally rectangular geometry. In the illustrative example of FIG. 15, each of the inlet and outlet portions 289A, 289B has a generally elliptical, circular cross-sectional geometry. However, it should be appreciated that other geometries can be utilized in accordance with the teachings disclosed herein.

Figure 17:
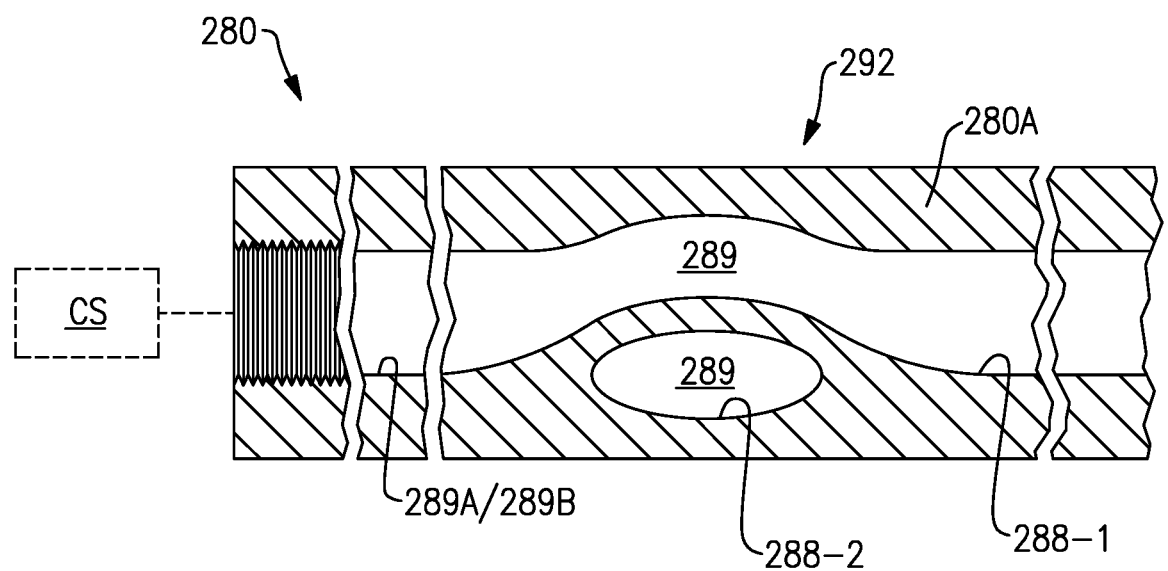
FIG. 17 illustrates yet another sectional view of the mounting plate taken along line 17-17 of FIG. 12.

A portion of the inner cooling circuit 288-1 can pass above or below a portion of the outer cooling circuit 288-2 at transition region 292, as illustrated by FIGS. 12 and 17. Each passageway 289 can have a generally elliptical, non-circular geometry at the transition region 292 to provide clearance between the adjacent passageway 289, as illustrated by the passageway 289 of outer circuit 288-2 in FIG. 17, which can reduce an overall thickness of the plate body 280A.

Figure 16:
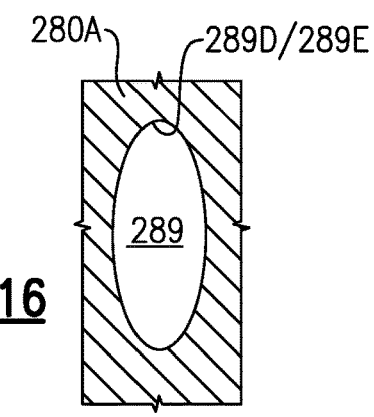
FIG. 16 illustrates another sectional view of the mounting plate taken along line 16-16 of FIG. 14.

Referring to FIGS. 12 and 14, each passageway 289 can include first and second transition sections 289D, 289E that interconnect the intermediate portion 289C and respective ones of the inlet and outlet portions 289A, 289B. The transition sections 289D, 289E can respectively taper inwardly from the intermediate portion 289C to the inlet and outlet portions 289B, 289C, as illustrated by FIG. 14. The transition sections 289D, 289E are contoured to provide a relatively smooth transition to reduce turbulence of fluid F and hydraulic jumps in the passageway 289. In the illustrative example of FIG. 16, the transition sections 289D, 289E have a generally elliptical, non-circular geometry. The inlet and outlet portions 289A, 289B can have threading to couple the passageway 289 to respective conduits in communication with the coolant source CS.

Referring to FIGS. 13 and 14, with continuing reference to FIG. 12, the intermediate portion 289C includes a plurality of elongated fins (or heat augmentation features) 290 that extend across the passageway 289. The fins 290 are arranged to interact with fluid F in the passageway 289 to cool adjacent portions of the mounting plate 280. The fins 290 extend partially from a first sidewall 289G towards a second sidewall 289H of the passageway 289 opposed to the first sidewall 289G. The fins 290 are dimensioned such that a terminal end of each fin 290 is spaced apart from the second sidewall 289H, and can be dimensioned such that each fin 290 extends at least a majority of a distance between the first and second sidewalls 289G, 289H, as illustrated by FIG. 13.

The fins 290 can be dimensioned to provide approximately 3-4 times more surface area along the passageway 289 than a tubular or rectangular passageway lacking any fins. Circulation of fluid F across the fins 290 can reduce a steady-state temperature of the mounting plate 280 along the bottom surface 280C below 100 degrees Fahrenheit or approximately ambient, for example.

Figure 18:
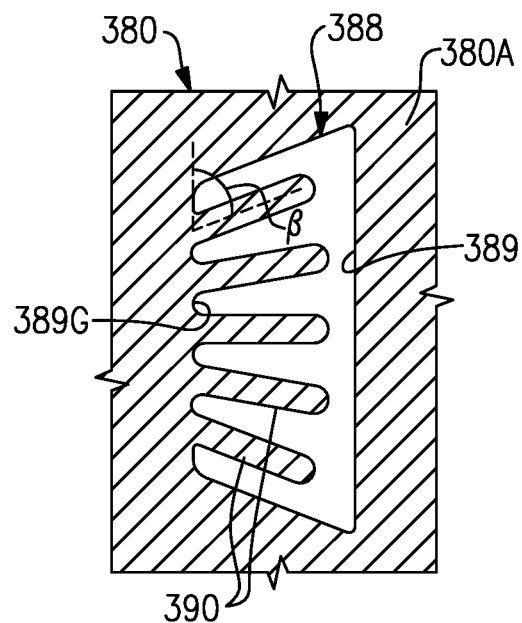
FIG. 18 illustrates a passageway according to another example.

The fins 290 can be arranged at various orientations. The fins 290 can be arranged substantially parallel to a general direction of flow of fluid F in the passageway 289. The fins 290 can have a generally planar geometry and can be arranged substantially parallel to each other, as illustrated by FIGS. 13 and 14. The fins 290 can be uniformly distributed along the first sidewall 2 such that the intermediate portion 289C has a substantially constant cross-sectional area for at least a majority, or each, position along a length of the intermediate portion 289C, as illustrated by FIG. 14. In the illustrative example of FIG. 18, passage 389 includes a plurality of fins 390 arranged in a fanned array such that an angle $\beta$ differs for at least some of the fins 390 relative to wall 389G. The angle $\beta$ of each fin 390 can be between 30-90 degrees relative to the wall 389G with some of the fins 390 defining an increasing angle $\beta$, one of the intermediate fins 390 defining a perpendicular angle β, and other fins 390 defining a decreasing angle β, for example.

The fins 290 can be arranged at various orientations relative to the abutment 280E. In the illustrative example of FIG. 13, the fins 290 of the inner circuit 288-1 extend in a third direction D3 away the abutment 280E, and the fins 290 of the outer circuit 288-2 extend in a fourth direction D4 away the abutment 280E such that the third direction D3 is opposed to the fourth direction D4. Arranging the fins 290 to extend in opposed directions can increase uniformity of cooling and can reduce thermal gradients and a likelihood of warpage of the mounting plate 280. Arranging the fins 290 to extend in opposed directions can increase an amount of material between the cooling circuits 288, which can provide a relatively wider load path LP through the mounting block 280. In other examples, the fins 290 of the inner and outer circuits 288-1, 288-2 generally face in the same direction and extend towards the abutment 280E.

Various techniques can be utilized to form the fins 290. In examples, the mounting plate 280 has a unitary construction, and the fins 290 integrally formed with the plate body 280A utilizing a casting, machine or additive manufacturing technique. In other examples, the fins 290 are separate and distinct components mechanically attached to the plate body 280A. The cooling scheme 286 can be formed such that the circuits 288 are substantially free of sharp corners that may otherwise cause turbulent flow, and which can improve the ability to remove powder particles that are not consumed during formation of the cooling scheme 286 utilizing an additive manufacturing technique.

A coating 299 (shown in dashed lines in FIG. 15 for illustrative purposes) can be deposited on surfaces of the passageways 289 subsequent to formation of the cooling scheme 286. Various techniques can be utilized to deposit the coating 299, such as a gaseous process, an aluminum-based slurry process, or an electroless plating process to provide corrosion resistance and/or improve conductivity. In examples, the passageways 289 are electroless copper or nickel plated, which can improve conductivity.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A mounting plate for forming a gas turbine engine component comprising:
a plate body extending in a first direction along a central axis between a top surface and a bottom surface of the plate body, the plate body extending in a second direction between a pair of sidewalls of the plate body that interconnect the top and bottom surfaces, the plate body defining an abutment along the top surface of the plate body, the abutment dimensioned to mate with a first forming die mountable to the plate body along the abutment such that the first forming die is opposed to a second forming die, an inner perimeter and an outer perimeter of the abutment looping about the central axis, and the plate body defining at least one internal cooling circuit;
wherein the at least one internal cooling circuit comprises:
a passageway including an intermediate portion interconnecting and looping between inlet and outlet portions;
wherein the intermediate portion is spaced apart from the abutment relative to the central axis for at least a majority of positions along the intermediate portion such that the plate body establishes a direct load path in the first direction between the abutment and the bottom surface; and
wherein the intermediate portion includes a plurality of fins extending partially from a first sidewall towards a second sidewall opposed to the first sidewall; and
wherein the at least one internal cooling circuit includes a first internal cooling circuit and a second internal cooling circuit fluidly isolated from the first internal cooling circuit within the plate body, the intermediate portion of the first internal cooling circuit and the intermediate portion of the second internal cooling circuit are defined on opposite sides of the direct load path relative to the second direction, an inner perimeter of the abutment extends at least 270 degrees about the intermediate portion of the first internal cooling circuit relative to the central axis, and the intermediate portion of the second internal cooling circuit extends at least 270 degrees about the outer perimeter of the abutment relative to the central axis.

2. The mounting plate as recited in claim 1, wherein the plurality of fins are integrally formed with the plate body, and each fin of the plurality of fins extends at least a majority of a distance between the first and second sidewalls.

3. The mounting plate as recited in claim 2, wherein the plurality of fins are uniformly distributed along the first sidewall such that the intermediate portion has a substantially constant cross-sectional area.

4. The mounting plate as recited in claim 2, wherein the plurality of fins are substantially parallel to each other.

5. The mounting plate as recited in claim 1, wherein a cross-sectional geometry of the inlet and outlet portions differs from a cross-sectional geometry of the intermediate portion.

6. The mounting plate as recited in claim 5, wherein the inlet and outlet portions have an elliptical cross-sectional geometry.

7. The mounting plate as recited in claim 5, wherein the passageway includes first and second transition sections that respectively taper inwardly from the intermediate portion to the inlet and outlet portions.

8. The mounting plate as recited in claim 1, wherein the plurality of fins of the first internal cooling circuit extend in a third direction away from the abutment, the plurality of fins of the second internal cooling circuit extend in a fourth direction away from the abutment and towards one of the pair of sidewalls of the plate body, and the fourth direction is opposed to the third direction.

9. The mounting plate as recited in claim 1, wherein the plate body includes at least one recess extending inwardly from at least one of the top and bottom surfaces of the plate body.

10. The mounting plate as recited in claim 9, wherein the at least one recess extends inwardly from an opening along the top surface of the plate body, and a perimeter of the opening is surrounded by the inner perimeter of the abutment.

11. The mounting plate as recited in claim 9, wherein the mounting plate is coupled to an actuator operable to move the mounting plate together with the first forming die towards the second forming die.

12. The mounting plate as recited in claim 11, wherein the bottom surface of the plate body is dimensioned to abut against a structural plate of a forming machine prior to movement of the plate body towards the second forming die in response to actuation of the actuator.

13. The mounting plate as recited in claim 1, wherein the abutment has a rectangular geometry.

14. The mounting plate as recited in claim 1, wherein the first forming die is made of a first material, and the mounting plate is made of a second material that differs from the first material.

15. The mounting plate as recited in claim 1, wherein a longitudinal axis of each of the fins establishes a respective angle relative to the first sidewall, and the fins are arranged in a fanned array such that the angle differs for at least some of the fins.

16. The mounting plate as recited in claim 15, wherein the fanned array is established such that the angle increases for an adjacent pair of the fins and such that the angle decreases for another adjacent pair of the fins.

17. The mounting plate as recited in claim 1, wherein a portion of the first internal cooling circuit passes above or below a portion of the second internal cooling circuit relative to the first direction at a transition region of the plate body.

18. The mounting plate as recited in claim 10, wherein the at least one recess is at least partially filled with a ceramic-based material.

* * * * *